May 2, 1933. S. JENCICK 1,907,115
AUTOMOTIVE TRANSMISSION MECHANISM
Filed Feb. 28, 1931
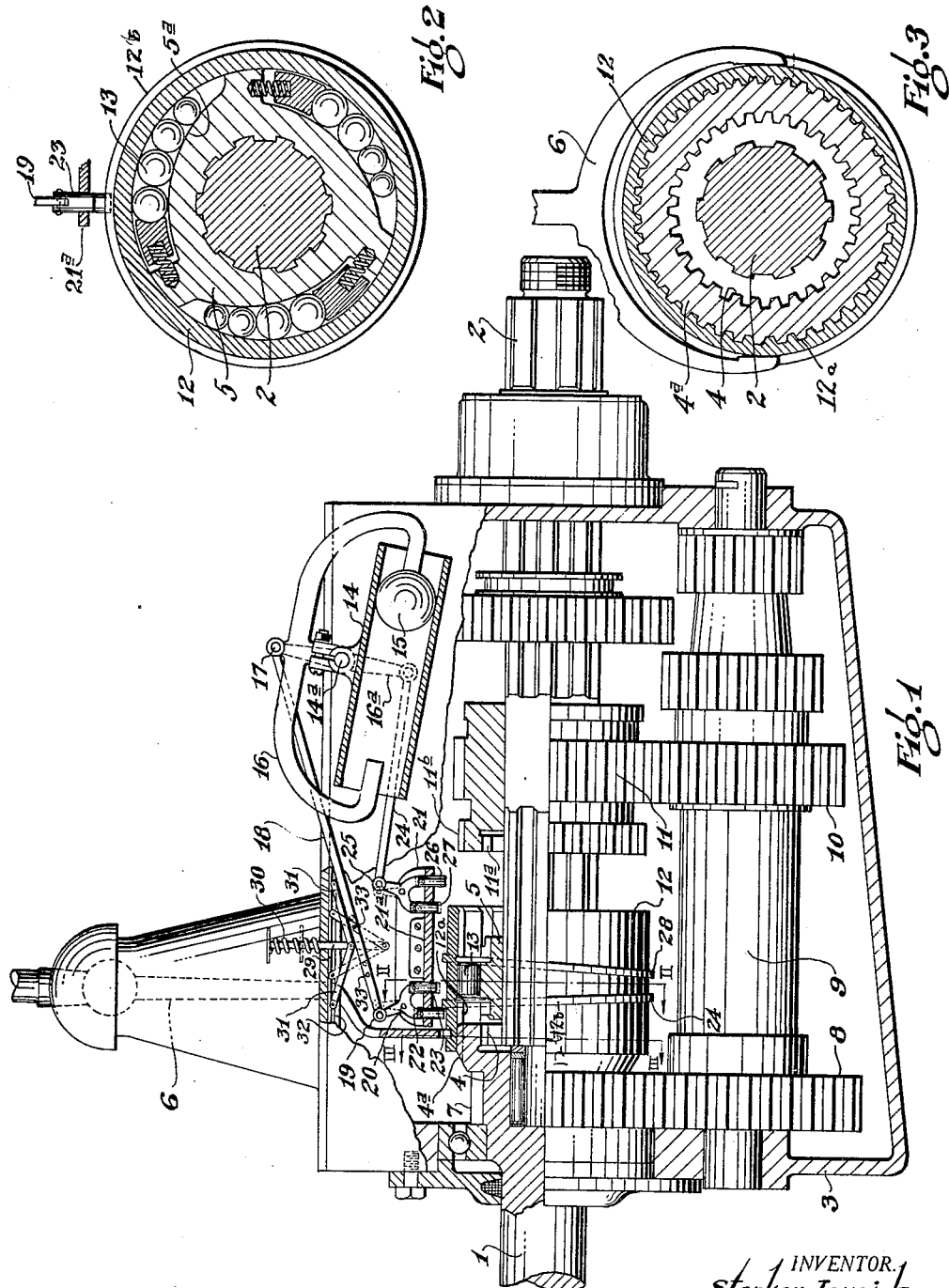
INVENTOR.
Stephen Jencick.
BY
ATTORNEYS.

Patented May 2, 1933

1,907,115

UNITED STATES PATENT OFFICE

STEPHEN JENCICK, OF CHAGRIN FALLS, OHIO

AUTOMOTIVE TRANSMISSION MECHANISM

Application filed February 28, 1931. Serial No. 519,132.

This invention relates to an improved automotive transmission mechanism.

As is well known, automotive transmissions have been provided with free wheel mechanism whereby the engine can drive the automobile but the momentum of the automobile can not drive the engine. This is accomplished by means of an over-running clutch, and the advantages are also well-known to those who are familiar with the art to which this class of inventions belongs.

In the particular type of device to which the present invention relates, the free-wheel operation is possible in either high or intermediate speeds, the interchange from the positive clutch engagement of high or intermediate gear to the free-wheeling operation and vice versa, being accomplished by means of a manually operated lever. This manner of control is well-known as for instance in certain popular automobiles at the present time.

The manner of operation just referred to, however, is objectionable for the reason that in order to effect the interchange from the free wheeling operation to the positive clutch engagement between the engine and the driven shaft, there is required an adjustment or manipulation of the hand lever by the driver, and failure upon the part of the driver might mean serious accident. Suppose for instance that the automobile is speeding under momentum as permitted by the free-wheel drive and that the automobile suddenly approaches and begins to descend a steep grade before the driver realizes the necessity of returning to the positive clutch engagement of the gears so as to obtain the benefit of the engine compression as a means of retarding the speed of the automobile. The danger incident to such a situation is obvious and it is this objectionable feature which the present invention is intended to overcome.

Accordingly, the object of the present invention is to devise a free-wheel drive mechanism in which the interchange from the free-wheel operating connection to the positive clutch connection of the gears will be effected automatically according to predetermined conditions of travel. That is, with the present invention, the initial descent of the automobile down a grade of a given degree will automatically and immediately discontinue the free-wheel drive and return to the positive gear connection between the engine and the driven shaft. In this way, there will at once be derived the benefit of compression of the engine as a retarding means, and there is precluded the danger of the continued coasting of the automobile down a serious grade.

A further object is to devise such an automatic mechanism which is controlled in its actuation by gravity and which is of a simple and dependable construction.

Other objects will appear from the following description and claims when considered together with the accompanying drawing.

Fig. 1 is a view of my improved transmission mechanism; partly in elevation and partly in section; Figs. 2 and 3 are taken on lines 2—2 and 3—3, respectively, of Fig. 1.

It is to be understood that the present disclosure is merely for purposes of illustration and that other modifications and variations may be made without departing from the spirit of the present invention as herein set forth and claimed.

In the combination of mechanism herein disclosed, the shaft 1 is operated directly from the automobile engine and is herein referred to as the drive shaft, while the shaft 2 which extends from the other or rear end of the transmission casing 3, is operatively connected to the axle of the automobile for propelling the same and is herein referred to as the driven shaft. These two shafts 1 and 2 are arranged in alignment with each other and in the present disclosure there are indicated only the high and intermediate gear ratios as these are the only combinations with which the present invention is concerned. This invention involves no changes in the remainder of the usual form of transmission and control means therefor.

As will be seen, either the manual or automatic adjustment may be effected without interfering with the other, and thus the usual hand shift lever may be operated at any time in the usual manner.

Upon the end of the drive shaft 1 there are provided the inner gear teeth 4 which are adapted for positive clutch engagement by the companion gear 5 splined upon the shaft 2 for positive driving connection from the engine. This combination of gears corresponds to high speed, and the gear 5 can be shifted into and out of mesh with the gear teeth 4 in the usual manner by means of the hand lever 6.

The drive shaft has also the gear teeth 7 which mesh with the gear 8 on the counter shaft 9. The gear 10 on the counter shaft 9 meshes with gear 11 freely mounted on the shaft 2 which is adapted to be driven thereby at a rate of speed corresponding to intermediate gear when the shiftable gear 5 is moved into mesh with the inner gear teeth 11$^a$. The mechanism described thus far is not new.

The free-wheeling unit 12 is arranged co-axially about the splined gear 5, as usual in this type of device; in fact, the gear 5 and the free-wheel drive means are identified and may be adjusted as a single unit by manipulation of the hand lever 6 in the usual manner. The members 5 and 12 may be recognized as companion parts of an overrunning clutch which includes the rollers 13 arranged in sets in the spaces provided between the cam surfaces 5$^a$ of the inner member and the surrounding inner surface of the outer ring member 12.

When the parts are in the position indicated in Fig. 1, with the teeth 12$^a$ upon the inner surface of the member 12 meshing with the teeth 4$^a$ on the outer surface of gear 4, there will be free-wheel drive, as is already well known in the art. Then upon adjusting the lever 6 so as to mesh the gear teeth 5 with the gear teeth 4, the free-wheel operation will be replaced by the positive gear engagement for regular high speed drive from the engine. This is also in accordance with the present practice. But, as above pointed out, a manual manipulation of the lever 6 is required in order to change from free-wheeling to the positive clutch connection from the engine.

The present improvement will now be referred to in detail as illustrated in the present drawing. Fixedly mounted in the housing 3 is the inclined tubular member 14 within which the ball 15 is adapted to roll according to the inclination of the member 14. This member 14 is adjustably mounted about the axis 14$^a$ so that the critical angle of inclination can be changed. The yoke arm 16 is rockably mounted about the same axis 14$^a$, the ends thereof extending into the member 14 so as to be actuated by ball 15, and this yoke has pivotal connection at 17 with the lever rod 18 which in turn is pivoted to the upper end of the lever 19 pivotally mounted at the point 20 upon the bracket 21 within the housing. The lower ends of the lever 19 have pivoted thereto the pins 22 and 23 which extend through the horizontal portion 21$^a$ of the bracket and are adapted for co-operation with the cam rib 12$^b$ which extends about the ring member 12. The lever arm 16 is extended upon the opposite or lower side of its axis and this lower lever arm 16$^a$ is pivoted to the lever rod 24 which in turn is pivotally connected to the lever 25. The lever 25 is mounted in the bracket 21 and its lower ends have pivotally mounted thereupon the pins 26 and 27 which project through the horizontal part of the bracket 21 for co-operation with the cam rib 28 which also extends about the ring member 12. The pins 22 and 23 and cam rib 24 are adapted for automatically effecting interchange between free-wheel drive and positive clutch connection for high gear, while the pins 26 and 27 and cam rib 28 are for the same automatic interchange in connection with intermediate gear ratio.

The position of the ball 15 and the lever connections as indicated in Fig. 1, corresponds to idle position of the automatic mechanism, and the free-wheel drive corresponding to high gear is in operation.

From the above it will be seen that should the down grade of the road cause the ball 15 to roll along the member 14 towards the left, as viewed in the drawing, the lever mechanism will be actuated so as to lower pin 23 into the path of the cam rib 24 which at once and automatically shifts the gear 5 into mesh with the gear teeth 4 for high gear positive clutch engagement, which will be maintained so long as the parts occupy this position.

Should the change in the grade of the road then permit the ball 15 to return to the position indicated in Fig. 1 and the lever mechanism likewise returns to the corresponding position, the pin 23 will be raised to its upper position so as to no longer be engaged by the cam 24, and the pin 22 will be lowered so as to be engaged by the other side of the cam 24 so as to automatically shift the gear 5 out of mesh and return to free-wheeling operation.

The same automatic adjustment as above outlined will take place also in connection with the intermediate gear. That is, if the lever 6 has been manipulated so as to effect free-wheel drive by engagement of the free-wheel unit 12 with the outer companion gear 11$^b$, the inclination of the tubular member 14 and the ball 15 will automatically cause the pin 27 to be lowered and to then engage the other cam 28 so as to thereby shift automatically from the free-wheel drive to the positive clutch engagement of the gear 5 with the inner gear 11ª for regulating intermediate drive connection from the engine. There results the same advantage as already explained in connection with the automatic shift to positive clutch engagement for high gear. And when the ball 15 returns to position indicated in Fig. 1, the lever mechanism will likewise be returned to the corresponding position as indicated, and the engagement of pin 26 with cam 28 will automatically return to free-wheeling.

In order that this automatic device should not interfere with the regular manipulation of the lever 6 for shifting at any time from positive clutch drive to free wheel drive and vice versa in either high or intermediate, and also from high to intermediate and vice versa, I have provided for a means whereby the effect of the automatic feature may be neutralized so as to prevent any interference by the pins and cams. Such means may take various forms and in the present accompanying illustration, I have shown a foot-operated rod 29 which extends through the floor board and which is normally maintained in raised position by the coil spring 30. The lower end of rod 29 is pivoted to the toggle arms 31, the outer or free ends of which are adapted for sliding movement in the slot of a plate 32 which is suitably mounted in fixed position. This lever mechanism is so constructed and arranged that upon depressing the rod 29 to its lower limit of movement, the arms 31 will extend in a wedge-like form between the pins 33 on the lever rod 18 so as to exert a cam action upon one or the other of them and thereby move the rod 8 either towards the right or the left so as to bring the same to neutral position with the pins 22, 23, 26, and 27, occupying the same level, as indicated by dotted lines. Thus, while the rod 29 is held in depressed position, these pins will be out of the path of the cams 24 and 28 and the interchange of drive connections may be effected by means of the hand lever 6 in the same manner as in the old free-wheeling type of automobile. Upon release of the foot rod 29, however, the effect of my present automatic control will be resumed.

Thus, there is afforded an increased degree of safety in the employment of the free-wheel operation, the present hazard due to the human factor of carelessness or neglect being hereby eliminated. Furthermore, the present invention eliminates the application of the brakes by the driver who is apt to resort to this means of retarding the speed of the automobile upon suddenly and unexpectedly starting to descend a steep grade. Thus, all of the objectionable features incident to such intensive use of the brakes, are eliminated by the present invention. Also, with the combination herein disclosed including the automatic control, there will be obtained maximum advantage of the free-wheel operation.

Other advantages will suggest themselves to those who are familiar with the art to which this invention belongs.

All modifications within the spirit of the present invention are intended to be comprehended by the following claims which are therefore not to be considered as limited to the specific form of construction herein illustrated and described.

What I claim is:

1. In an automotive transmission mechanism, the combination of a drive shaft, a driven shaft, positive and over-running connecting means adapted for interchangeable engagement between said shafts, and means for automatically effecting such interchange directly according to the grade of the road upon which the automotive device is traveling.

2. In an automotive transmission mechanism, the combination of a drive shaft, a driven shaft, positive and over-running connecting means adapted for interchangeable engagement between said shafts, and means automatically solely actuated by the grade of the road upon which the automotive device is traveling for effecting engagement of the positive connecting means.

3. In an automotive transmission mechanism, the combination of a drive shaft, a driven shaft, positive and over-running connecting means adapted for interchangeable engagement between said shafts, and means automatically actuated by the grade of the road upon which the automotive device is traveling and independently of speed for substituting the positive for the over-running connection.

4. In an automotive transmission mechanism, the combination of a drive shaft, a driven shaft, positive and over-running connecting means adapted for interchangeable engagement between said shafts, and means including gravity controlled mechanism for automatically effecting such interchange.

5. In an automotive transmission mechanism, the combination of a drive shaft, a driven shaft, positive and over-running connecting means adapted for interchangeable engagement between said shafts, and means including gravity controlled lever mechanism for automatically effecting such interchange.

6. In an automotive transmission mechanism, the combination of a drive shaft, a driven shaft, positive and over-running connecting means adapted for interchangeable engagement between said shafts, and means for automatically effecting such interchange, said last-named means including gravity-controlled mechanism and a cam co-operating therewith.

7. In an automotive transmission mechanism, the combination of a drive shaft, a driven shaft, positive and over-running connecting means adapted for interchangeable engagement between said shafts, and means for automatically effecting such interchange, said last-named means including a rotatable cam and gravity-controlled means for actuation of said cam.

8. In an automotive transmission mechanism, the combination of a drive shaft, a driven shaft, positive and over-running connecting means adapted for interchangeable engagement between said shafts, said connecting means including an adjustable unitary clutch element arranged co-axially with the drive and driven shafts, a radially extensible member, gravity-controlled means for determining the position of said member, and a rotatable cam adapted for engagement with said member for adjustment of said element so as to effect such interchange.

9. In an automotive transmission mechanism, the combination of a drive shaft, a driven shaft, a plurality of gear ratios for positive drive connection between said shafts, means including a shiftable unitary clutch element arranged co-axially with the drive and driven shafts for effecting either of said gear ratios, means for shifting said clutch element, an over-running connecting means shiftable with said unitary element and adapted for substitution in either of said gear ratios, and a unitary gravity controlled mechanism for automatically effecting the interchange between said positive drive connection and said over-running connecting means in either of said gear ratios.

10. In an automotive transmission mechanism, the combination of a drive shaft, a driven shaft, a plurality of gear ratios for positive drive connection between said shafts, means including a shiftable unitary clutch element arranged co-axially with the drive and driven shafts for effecting either of said gear ratios, means for shifting said clutch element, an over-running connecting means shiftable with said unitary element and adapted for substitution in either of said gear ratios, and a cam control mechanism actuated according to the grade of the road upon which the automotive device is travelling for automatically effecting the interchange between said positive drive connection and said over-running connecting means in either of said gear ratios.

11. In an automotive transmission mechanism, the combination of a drive shaft, a driven shaft, a plurality of gear ratios for positive drive connection between said shafts, means including a shiftable unitary clutch element arranged co-axially with the drive and driven shafts for effecting either of said gear ratios, means for shifting said clutch element, an over-running connecting means shiftable with said unitary element and adapted for substitution in either of said gear ratios, and a unitary control mechanism for automatically effecting the interchange between said positive drive connection and said over-running connecting means in either of said gear ratios, said control mechanism including a gravity means whereby such interchange will be effected according to the grade of the road upon which the automotive device is traveling.

12. In an automotive transmission mechanism, the combination of a drive shaft, a driven shaft, positive and over-running connecting means adapted for interchangeable engagement between said shafts, manual means for effecting such interchange, and automatically gravity actuated means for also effecting such inter-change according to the grade of the road upon which the automotive device is traveling.

13. In an automotive transmission mechanism, the combination of a drive shaft, a driven shaft, a plurality of gear ratios for positive drive connection between said shafts, means including a shiftable unitary clutch element arranged co-axially with the drive and driven shafts for effecting either of said gear ratios, means for shifting said clutch element, an over-running connecting means shiftable with said unitary element and adapted for substitution in either of said gear ratios, and a unitary control mechanism for automatically effecting the interchange of said over-running connecting means in either of said gear ratios, said control mechanism including a radially extensible means, gravity-controlled means for determining the position of said radially extensible means, and a unitary rotatable cam means adapted for engagement with said extensible means for adjustment of said element so as to effect such interchange.

14. In an automotive transmission mechanism, the combination of a drive shaft, a driven shaft, positive and over-running connecting means adapted for interchangeable engagement between said shafts, automatically gravity actuated means for effecting such interchange according to the grade of the road upon which the automotive device is travelling, and means for suspending the operation of said automatic means.

15. In an automotive transmission mechanism, the combination of a drive shaft, a driven shaft, a plurality of gear ratios for positive drive connection between said shafts, means including a shiftable unitary clutch element arranged co-axially with the drive and driven shafts for effecting either of said gear ratios, means for shifting said clutch element, an over-running connecting means shiftable with said unitary element and adapted for substitution in either of said gear ratios, a unitary gravity controlled mechanism for automatically effecting the interchange between said positive drive connection and said over-running connecting means in either of said gear ratios, and means for suspending the operation of said automatic means.

16. In an automotive transmission mechanism, the combination of a drive shaft, a driven shaft, positive and over-running connecting means adapted for interchangeable engagement between said shafts, control mechanism for effecting such interchange, and means including a ball and run-way within which the ball may move by gravity for effecting automatic actuation of said control mechanism.

17. In an automotive transmission mechanism, the combination of a drive shaft, a driven shaft, positive and over-running connecting means adapted for interchangeable engagement between said shafts, control mechanism for effecting substitution of the positive for the over-running connecting means and vice versa, and gravity controlled means for automatically actuating said control mechanism.

18. In an automotive transmission mechanism, the combination of a drive shaft, a driven shaft, positive and over-running connecting means adapted for interchangeable engagement between said shafts, control mechanism for effecting such interchange, and gravity controlled means for automatically actuating said control mechanism so as to substitute the positive for the over-running connecting means and vice versa according to the grade of the road upon which the automotive device is travelling.

19. In an automotive transmission mechanism, the combination of a drive shaft, a driven shaft, positive and over-running connecting means adapted for interchangeable engagement between said shafts, control mechanism for effecting such interchange, and means including a ball and runway within which the ball may move by gravity for automatically actuating said control mechanism so as to substitute the positive for the over-running connecting means and vice versa according to the grade of the road upon which the automotive device is travelling.

In witness whereof, I hereby affix my signature.

STEPHEN JENCICK.